United States Patent [19]

Cheng et al.

[11] 3,982,527

[45] Sept. 28, 1976

[54] METHOD AND APPARATUS FOR CONCENTRATING, HARVESTING AND STORING OF SOLAR ENERGY

[76] Inventors: Chen-yen Cheng, 9605 La Playa St. NE., Albuquerque, N. Mex. 87111; Sing-Wang Cheng, No. 1, Lane No. 479, Fu-shing No. Road, Taipei, China /Taiwan

[22] Filed: Jan. 2, 1974

[21] Appl. No.: 429,500

[52] U.S. Cl. .............................. 126/270; 126/271
[51] Int. Cl.$^2$ ............................................ F24J 3/02
[58] Field of Search ............................ 126/270, 271

[56] References Cited
UNITED STATES PATENTS

| | | | |
|---|---|---|---|
| 1,575,309 | 3/1926 | Anderson | 126/271 |
| 1,855,815 | 4/1932 | Abbot | 126/271 |
| 3,107,052 | 10/1963 | Garrison | 126/271 |
| 3,134,906 | 5/1964 | Henker | 126/270 |

FOREIGN PATENTS OR APPLICATIONS

| | | | |
|---|---|---|---|
| 1,287,760 | 2/1962 | France | 126/270 |

*Primary Examiner*—John J. Camby
*Assistant Examiner*—Henry C. Yuen

[57] ABSTRACT

The present invention, introduces (i) a reflector-heat sink panel with myriads of miniature parabolic mirrors and conductive heat collectors and (ii) a flattened focusing mirror. The reflector-heat sink panel has a transparent cover, a multiplicity of miniature parabolic mirrors to focus the Sun's rays into their respective focal regions which also serve as heat sink regions. For an efficient operation, heat generated in these regions is collected and transmitted to a heat transfer surface which is located on the backside relative to the mirror surfaces by conductive heat collecting branches and a conductive main and is transmitted to a heat absorbing medium. Another convenient way is to use the space separating the transparent cover and the mirror surfaces as a conduit to carry a heat absorbing medium and use the surfaces of conductive heat collecting branches and the mirror surface as the heat transfer surface of transmitting heat energy to the heat absorbing medium. Converging lens-heat sink panels which do similar job as that of reflector-heat sink panels are also described. The flattened focusing mirror is a thin multistep mirror which functions as a regular parabolic mirror with a relatively large focal length. What a flattened focusing mirror is to a regular parabolic mirror is about what a Fresnel lens is to a regular lens.

The invention also introduces a multiple focusing method of accomplishing an even higher degree of concentrating solar energy and ways of storing heat energy at a relatively high temperature. In the multiple focusing method a wide band of the Sun's parallel rays is first reduced into a narrow band of parallel and concentrated rays, which is then reconverged into concentrated bands and harvested by a narrow reflector-heat sink panel. In another embodiment, several narrow bands of parallel and concentrated rays are formed and combined into a large band of parallel and concentrated rays and refocused into a set of very highly concentrated rays.

15 Claims, 46 Drawing Figures

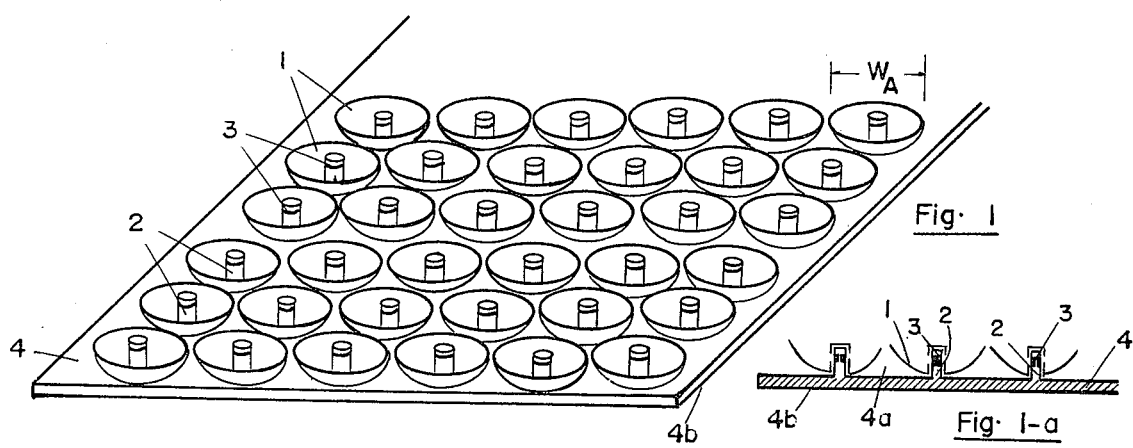
Fig. 1
Fig. 1-a
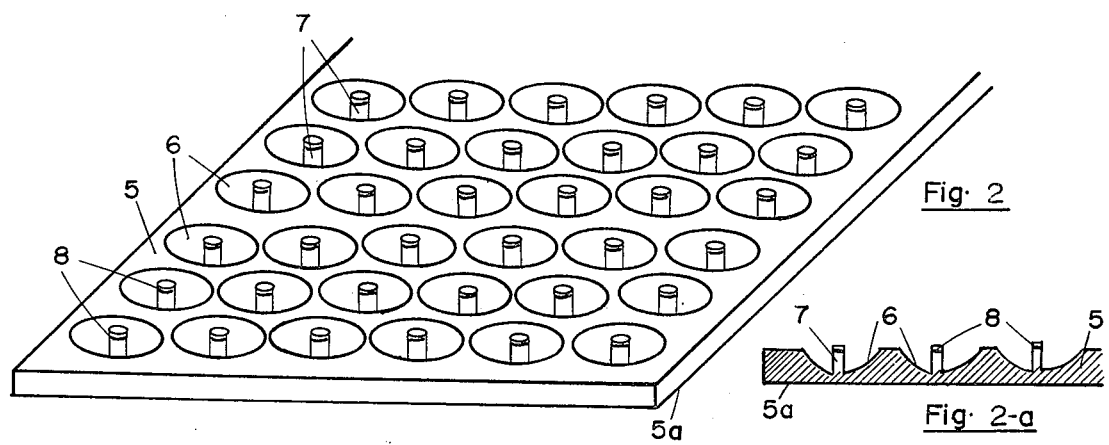
Fig. 2
Fig. 2-a
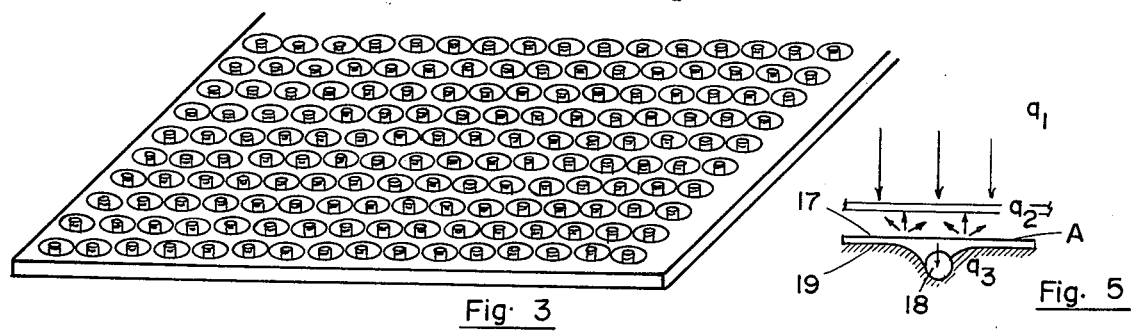
Fig. 3
Fig. 5
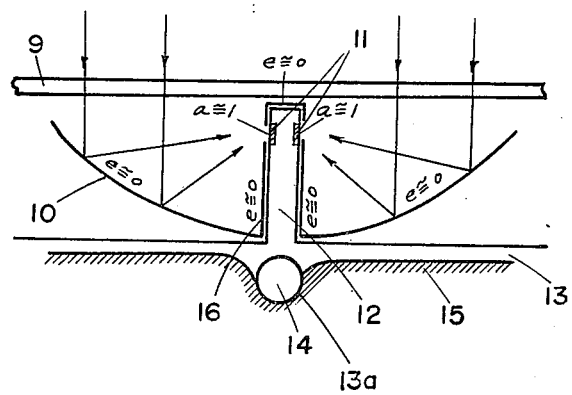
Fig. 4
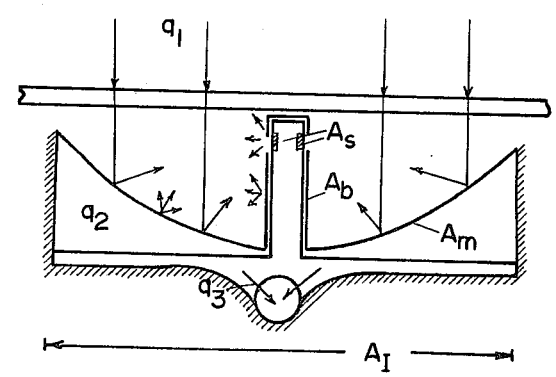
$q_1 = q_2 + q_3$
Fig. 6

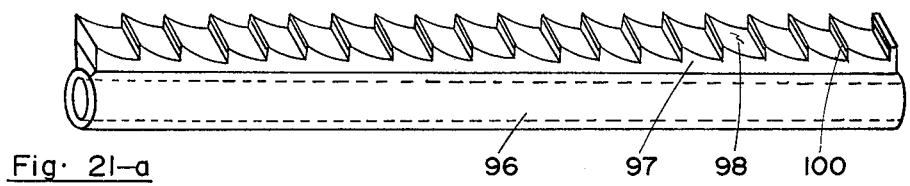
Fig. 21-a
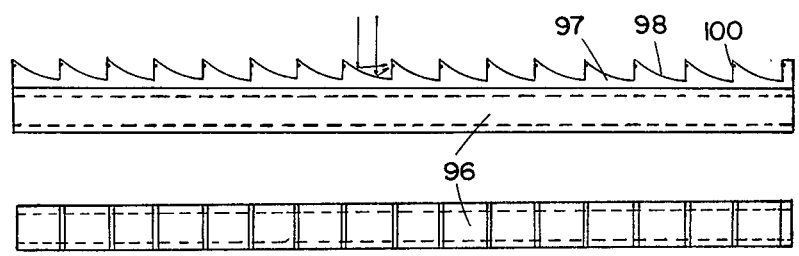
Fig. 21-b
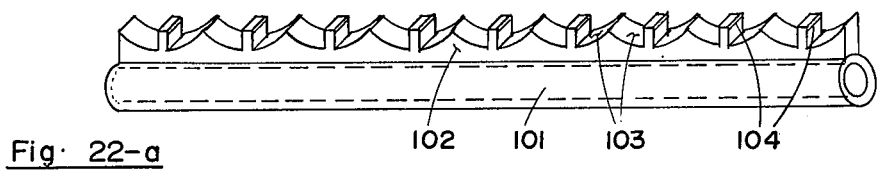
Fig. 22-a
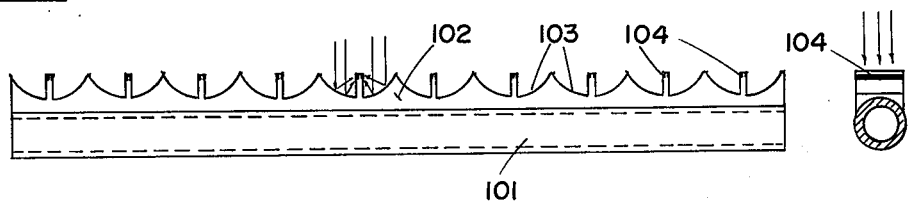
Fig. 22-b
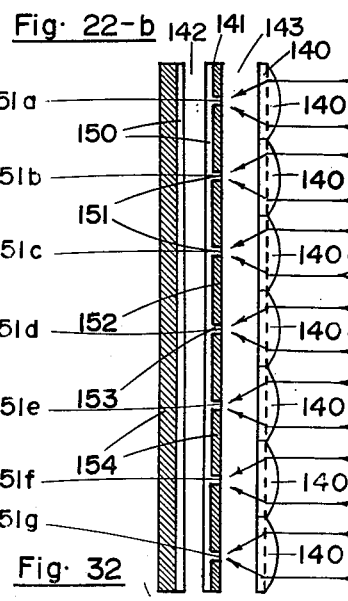
Fig. 32
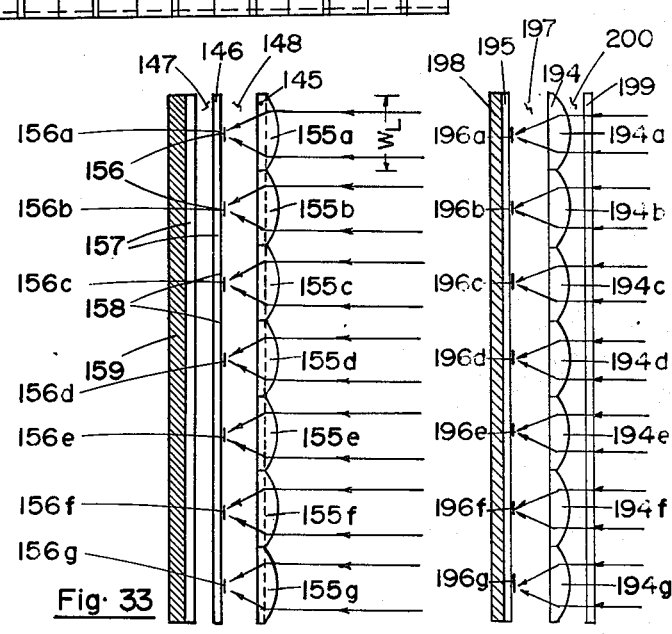
Fig. 33    Fig. 33a

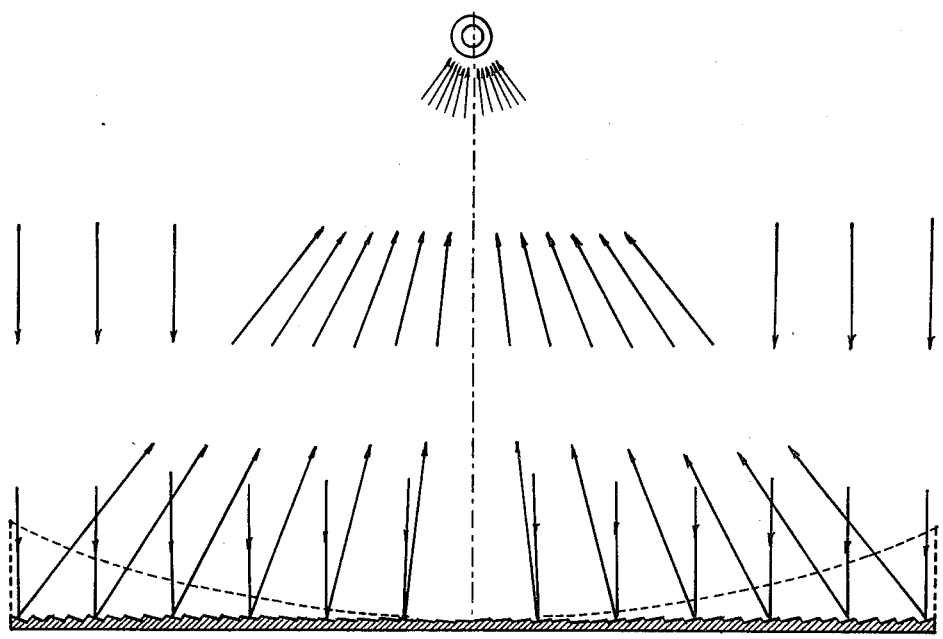
Fig. 24
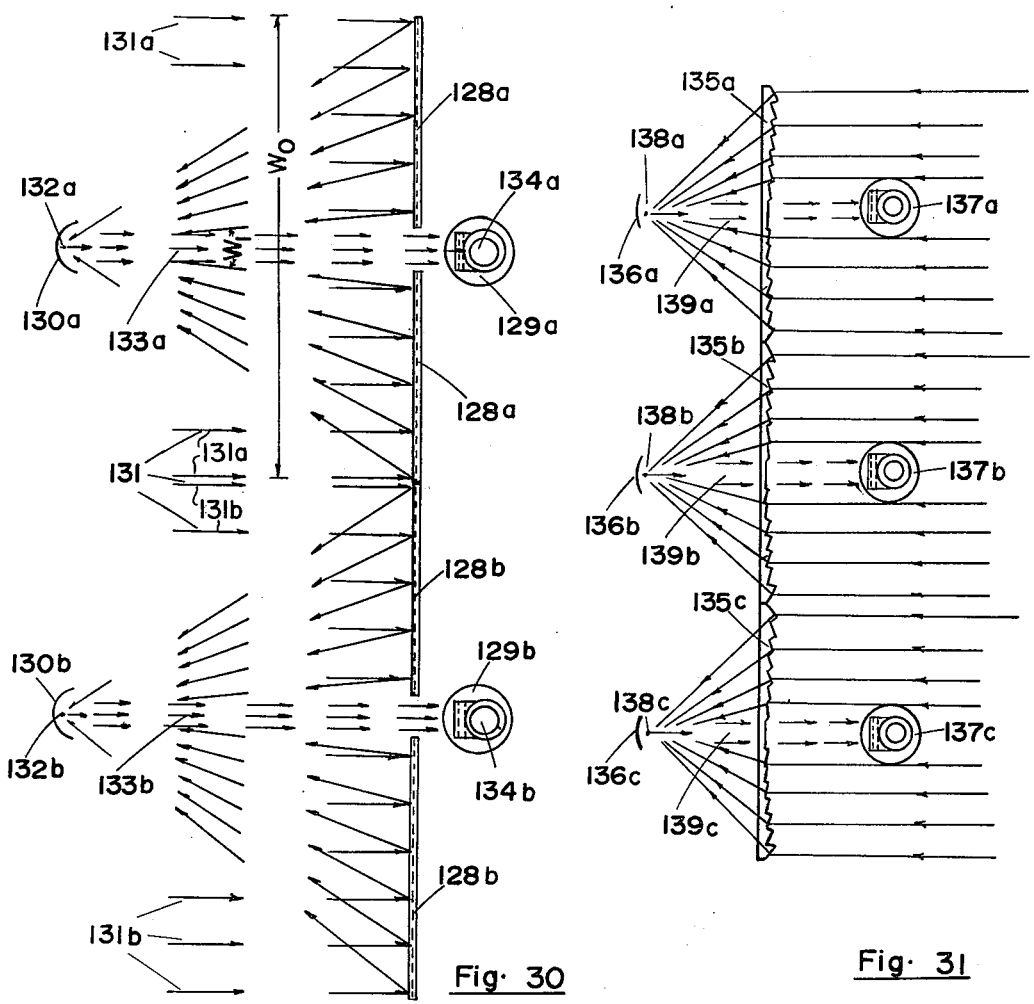
Fig. 30
Fig. 31

METHOD AND APPARATUS FOR CONCENTRATING, HARVESTING AND STORING OF SOLAR ENERGY

BACKGROUND OF THE INVENTION

1. Field of Invention

The present invention relates to method and apparatus for concentrating and harvesting solar energy.

2. Brief Description of the Prior Art

This section is divided into three subsections. The prior art related to concentration of solar energy is reviewed in the first subsection and the prior art related to harvesting solar energy, concentrated and unconcentrated, is reviewed in the second subsection. And finally, the prior art related to storage of heat energy is reviewed in the third subsection.

2-a Concentration of Solar Energy

Conventionally, parabolic mirrors and Fresnel lenses have been used in concentrating Sun's rays. One may use a mirror in the shape of a paraboloid of revolution or a longitudinal mirror with parabolic cross-section taken in the direction perpendicular to the longitudinal direction of the mirror. The former may be simply referred to as a paraboloidal mirror and the latter may be referred to as a longitudinal parabolic mirror. Paraboloidal solar energy concentrators have been built by French Solar Laboratory in Pyreness, France, National Physical Laboratory in New Delhi, India (as solar cookers), and more recently by Westinghouse Corp., and Sunstrand Aviation Co., Denver, Colo. Longitudinal parabolic solar energy concentrators were built in Meadi, Egypt in 1913, later by Dr. Abott in U.S.A. and more recently by Drs. Aden and Marjorie Meinel in University of Arizona. Fresnel lenses can also be classified into circular Fresnel lenses and Longitudinal Fresnel lenses. C. P. Gilmore described a solar farm proposed by Drs. Meinel in Popular Science, Pp. 86–89, Dec. 1972. In this future solar farm, Drs. Meinel plan to use longitudinal Fresnel lenses for concentrating the Sun's rays on heat-collecting tubes. Circular Fresnel lenses and paraboloidal mirrors are obtainable from Edmund Scientific Co. N.J..

2-b Harvesting of Solar Energy

Solar energy may be harvested with or without a concentration step. In the solar heated houses that have been built, solar energy are harvested without a concentration step. In the famous Dover House deseigned by Dr. Maria Telkes, the collector or the harvestor is simply a black sheet of thin-gage iron mounted vertically behind double glass panes along the whole south wall on the first floor of the house. A low cost solar energy harvesting panel which comprises of a metal plate and multiplicity of beer cans coated black inside has recently been presented.

The solar power collector built by Drs. Meinel in the University of Arizona comprises of a longitudinal parabolic mirror, a glass vacuum pipe silvered inside and a coated steel pipe located within the glass vacuum pipe. A detail description of this unit appears in Popular Science, Pp. 86–89 and Pp. 112–114, Dec. 1972. The solar power collector operates as the parabolic mirror concentrates the Sun's rays on the coated steel tube. The coated steel tube is covered with thin-film optical layers to increase its heat-absorbing efficiency. Glass vacuum pipe is silvered inside except for small clear windows at bottom, which admit the concentrated sun's rays. Inside, light energy bounces around until it hits the coated steel pipe and is absorbed. The glass pipe is evacuated to prevent heat loss by convection. As the collector absorbs light in the visible range and converts it to heat, it radiates the heat in the form of infrared rays. Due to this radiative heat loss and other convective heat losses, a collector soon reaches a steady state temperature. Interference stacks have been used by this group of researchers to increase a/e ratio, where a is absorbance and e is emittance. Interference stacks are made by vacuum depositing thin layers of aluminum oxide, silicon or other substances on metal plates. The coated layer on the steel pipe form an interference stack.

Solar energy can also be harvested by a direct conversion into electric energy. Certain semiconductor materials such as silicon absorb photons of light and generate a small electric potential. The arrays of solar cells that power many spacecrafts work this way.

2-c Storing of Heat Energy

Solar energy harvested as heat energy can be stored as sensible heat of water and rocks or as latent heat of some selected substances. In the solar heated houses that have been built, the solar energy is converted into heat energy at a relatively low temperature level, 80° to 125°F, and the chemicals chosen for heat storage together with their melting points and heat of fusion are listed in Table 1.

TABLE 1

| Chemicals for Heat Storage | | |
|---|---|---|
| Salt | Melting Point, degrees F | Heat of Fusion, Btu per lb |
| Na$_2$CO$_3$ 10 H$_2$O | 90–97 | 115 |
| Na$_2$HPO$_4$ 12 H$_2$O | 97–118 | 114 |
| Na$_2$SO$_4$ 10 H$_2$O | 88–90 | 104 |
| Ca(NO$_3$)$_2$ 4 H$_2$O | 104–108 | 90 |
| Na$_2$S$_2$O$_3$ 5 H$_2$O | 120–126 | 90 |
| CaCl$_2$ 6 H$_2$O | 84–102 | 75 |

*The heat storage capacity of the above materials is about 10,000 Btu per cubic foot.

BRIEF DESCRIPTION OF THE PRESENT INVENTION

The present invention introduces a reflector-heat sink panel which is of a thin structure having a transparent window for admitting the Sun's rays, myriads of miniature parabolic mirrors for focusing the Sun's rays into their respective focal regions which also serve as heat sink regions, conductive heat collecting branches and a conductive main for collecting the heat generated in the myriad of heat sink regions to a heat transfer surface for transmitting heat energy to a heat absorbing medium. The unit may be evacuated and insulated to minimize convective heat loss. For an efficient operation, the heat transfer surface is located on the backside relative to the mirror surfaces. A convenient way is to use the space between the transparent cover and the mirror surface as a conduit for carrying a heat absorbing medium, and place another transparent cover in front of the original transparent cover and evacuate the space separating the two transparent covers to minimize heat loss. Converging lens-heat sink panels which do the same job as that of reflector-heat sink panels are also introduced. A high concentration and an efficient harvesting of solar energy can be accomplished by the use of either a reflector-heat sink panel or a converging lens-heat sink panel.

The invention also introduces a flattened focusing mirror which functions in the way similar to that of a regular parabolic mirror with a relatively large focal length but is made in multiplicity of steps to reduce it into a thin form. In a word, what a flattened focusing mirror is to a regular parabolic mirror is about what a Fresnel lens is to a regular lens.

The invention also introduces a multiple focusing method which accomplishes an even higher degree of concentration of solar energy. In one embodiment, a wide band of parallel rays of the Sun is first converged by a first focusing means, such as a parabolic mirror or a Fresnel lens. The resulting rays are converted into a narrow band of parallel rays by a properly placed mirror or a lens, and the narrow band of parallel rays are converged again and harvested by a narrow reflector-heat sink panel. In another embodiment, several narrow bands of parallel rays formed in the manner described may be combined into a wide band and focused again by another focusing means.

Because of the high degree of concentration of solar energy and because of the minimization of convective and radiative heat losses, heat energy can be made available at a relatively high temperature, say more than 300°F, compared with conventional heat storage temperature, 80°F to 125°F. Storing heat at such a relatively high temperature can be accomplished by using a substance whose phase transition temperature falls within the desired temperature range. One may also use a reversible chemical reaction which reverses its direction of reaction within the desired temperature range. Since heat is made available at a high temperature, it may be used in refrigeration and power generation in addition to simple heating.

BRIEF DESCRIPTION OF THE DRAWINGS

FIGS. 1 and 1a illustrate a reflector-heat sink panel with miniature paraboloidal mirrors and conductive heat collectors. The paraboloidal mirrors and a conductive heat collector panel are separately made and are assembled in place.

FIGS. 2 and 2a illustrate a reflector-heat sink panel in which miniature parabolic mirrors, conductive heat collecting branches and a conductive heat collecting main are made as an integrated unit.

FIG. 3 illustrates a unit similar to that of FIG. 2, except that the size of the mirrors and heat collectors are reduced. FIGS. 2 and 3 are shown together to show the effect of miniaturization to the amount of material needed in their construction.

FIG. 4 illustrates the mechanisms of concentrating and harvesting solar energy. The same mechanisms apply to all reflector-heat sink panels of the present invention.

FIG. 5 illustrates heat energy balance relation for a plane solar energy absorber.

FIG. 6 illustrates heat energy balance relation which applies to all of reflector-heat sink panels of the present invention.

A reflector-heat sink panel may be made into a swinging form so that the unit may be aimed directly at the sun or into a non-swinging form.

Figure 20:
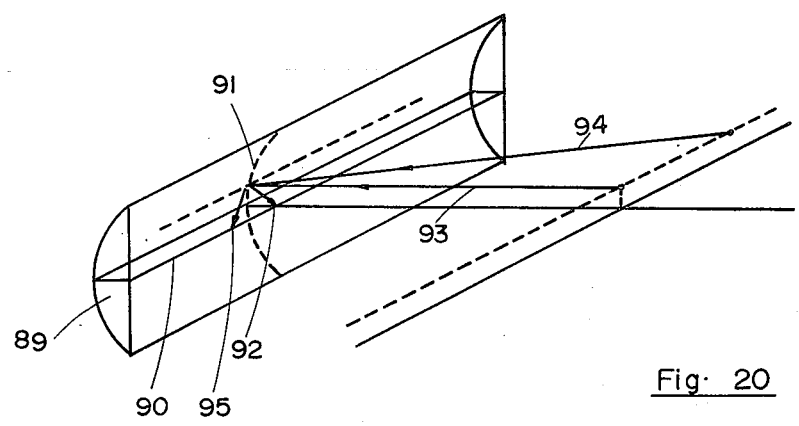

FIG. 20 illustrates the paths of the Sun's rays reflected by a non-swinging but properly oriented panel.

FIGS. 21a, 21b, and 22a, 22b, illustrate two types of narrow reflector-heat sink panels, which may be used in the multiple focusing method described.

Figure 23:
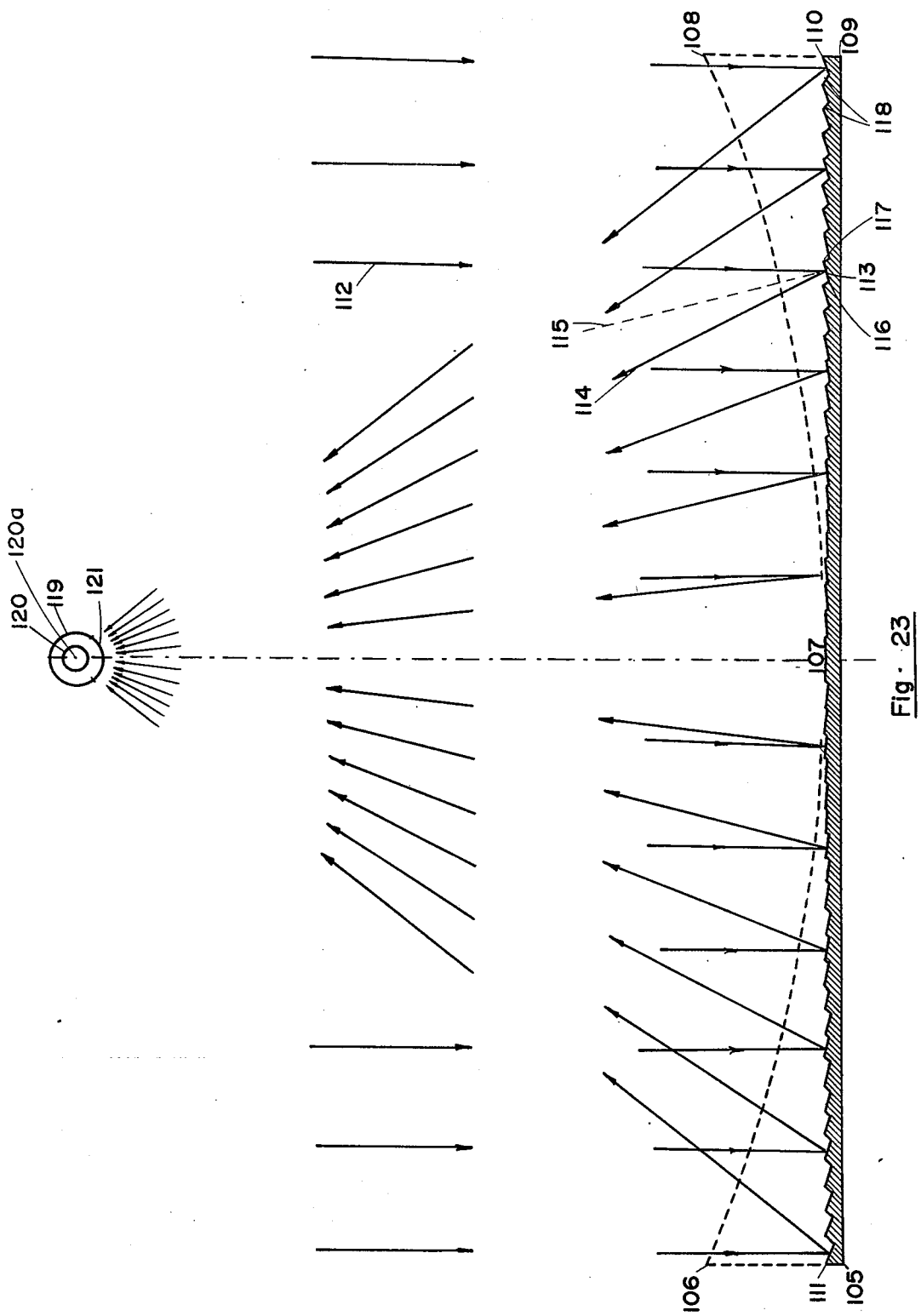

FIGS. 23 and 24 illustrate flattened parabolic mirrors of different sizes.

FIGS. 25a, 25b and 26a, 26b, show that a flattened parabolic mirror may be of a circular type or a longitudinal type.

Figure 27:
Figure 28:
Figure 29:
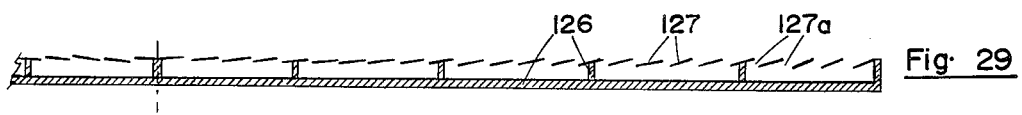
Figure 25A:
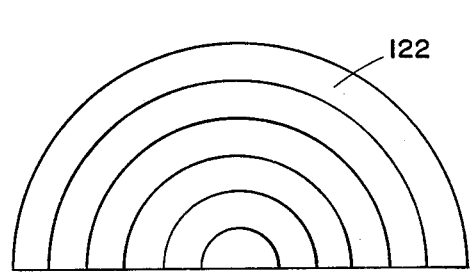
Figure 26A:
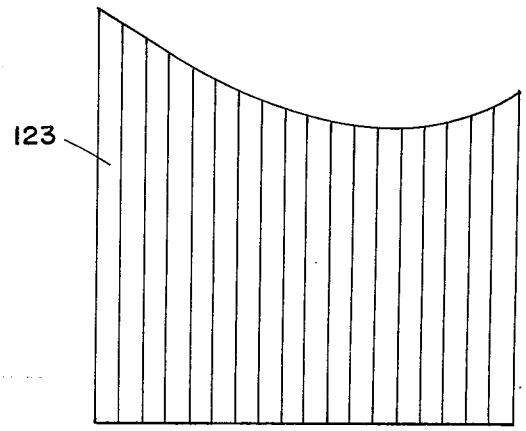
Figure 25B:
Figure 26B:

FIGS. 27, 28 and 29 respectively show that a flattened parabolic mirror may be made by an extrusion operation, by pressing operation or by forming a louver out of a polished sheet.

Figure 34:
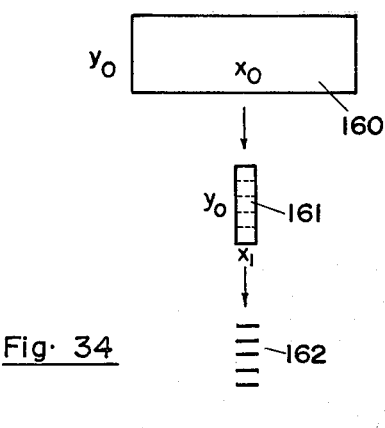
Figure 35:
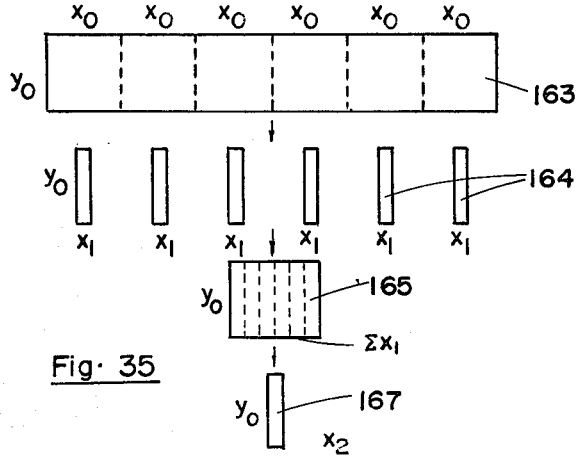

FIGS. 34 and 35 respectively illustrate the principles of Type A and Type B multiple focusing methods.

FIGS. 30 and 31 illustrate systems utilizing Type A focusing method and using flattened parabolic mirrors and Fresnel lenses respectively.

Figure 36:
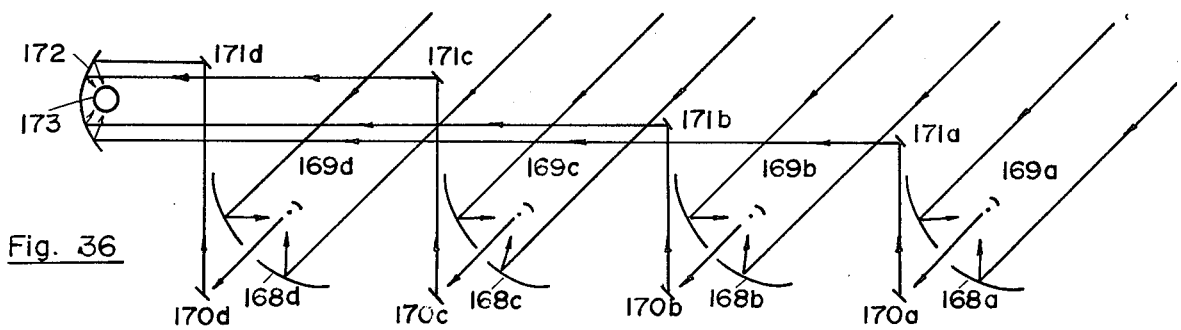
Figure 38:
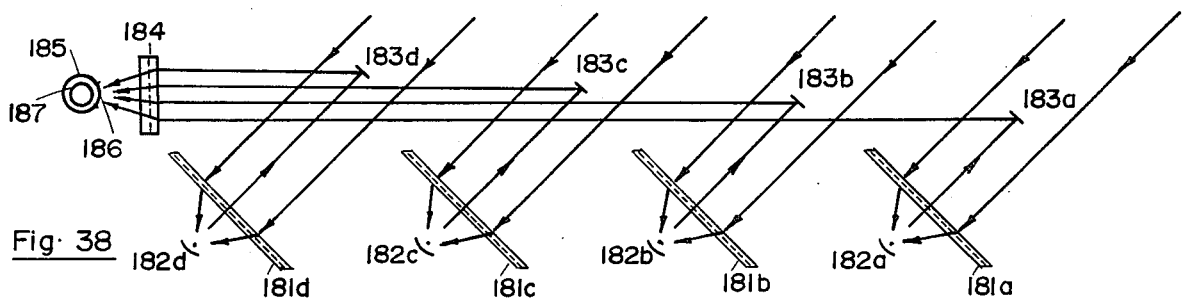

FIGS. 36 and 38 illustrate systems utilizing Type B focusing method and using parabolic mirrors and Fresnel lenses respectively.

Figure 37:
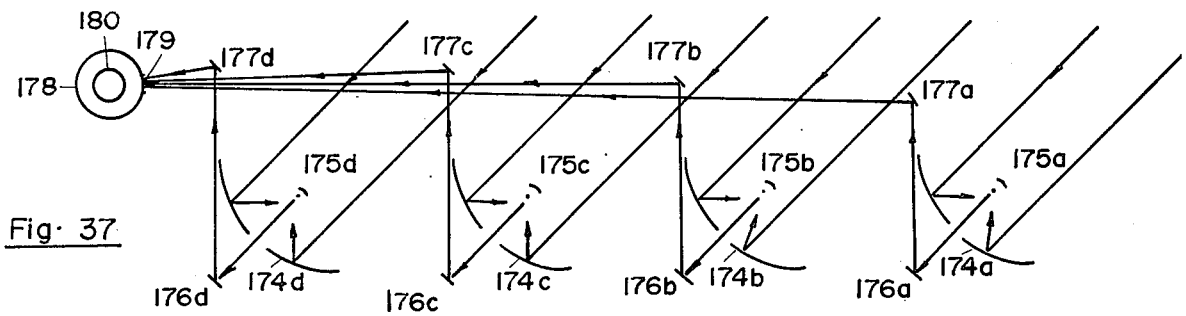
Figure 39:
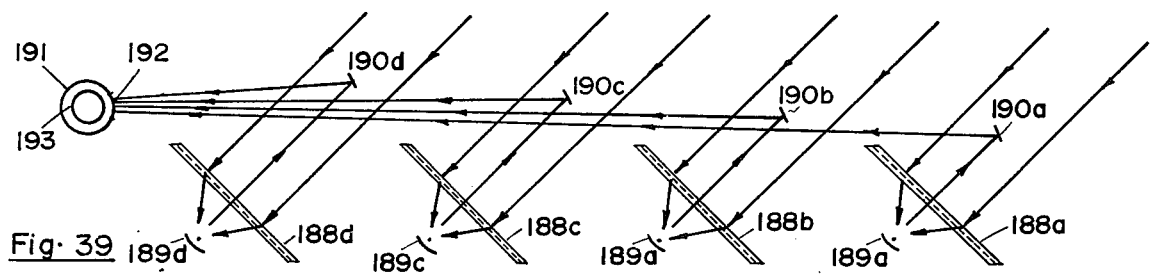

FIGS. 37 and 39 illustrate systems utilizing Type B modified focusing method and using parabolic mirrors and Fresnel lenses respectively.

FIGS. 32, 33 and 33a show converging lens-heat sink panels of various designs. Such a panel has an integrated converging lens plate, a special heat sink plate and a conduit to carry a heat absorbing medium.

DESCRIPTION OF PREFERRED EMBODIMENTS OF THE INVENTION

The preferred embodiments of the invention is to be presented in five sections. Various types of reflector-heat sink panels are described in Section I. Constructions and ways of manufacturing flattened focusing mirrors are described in Section II. The multiple focusing method of accomplishing a high degree concentration of solar energy is described in Section III. Various types of converging lens-heat sink panels are described in Section IV, and ways of storing heat at a relatively high temperature level are described in Section V.

I. Reflector-Heat Sink Panels with Multitude of Focusing Mirrors and Conductive Heat Collectors There are three types of reflector-heat sink panels, depending on the type of mirrors used in the panel. Those panels using miniature paraboloidal mirrors will be referred to as Type A panels and are described in Section I-A. Those panels using miniature longitudinal parabolic mirrors will be referred to as Type B panels are described in Section I-B. Those panels using miniature longitudinal semiparabolic mirrors will be referred to as Type C panels and are described in Section I-C. Narrow reflector-heat sink panels which are useful in the multiple focusing method are described in Section I-D. The mechanisms by which solar energy can be concentrated and harvested by a reflector-heat sink panel are presented in detail only in Section I-A in connection with Type A panels and will not be repeated for Type B and Type C panels, since the mechanisms are similar in all cases and therefore will be obvious to one skilled in the art.

I-A Reflector-Heat Sink Panels with Multitude of Paraboloidal Mirrors — Type A Panels Referring to FIG. 1 and FIG. 1a, a type A reflector-heat sink panel comprises of plurality of miniature paraboloidal mirrors 1, conductive heat collecting branches 2, miniature heat sink regions 3, a conductive heat collecting main 4, a heat transfer surface for transmitting heat to a heat absorbing medium 4b, and a transparent cover plate for transmitting the Sun's rays into the panel (not shown in the figure). A paraboloidal mirror, a heat collecting branch and a miniature heat sink form a set and the heat sink is located at the upper end of the branch. The spaces behind the mirrors 4a may either by empty or be filled with an insulating material. The mirrors may either by made of an insulating material or a heat conductive material. Referring to FIG. 1a, the conductive heat collecting branches and the main may be made as an integrated unit, and paraboloidal mirrors may then be attached to the branches as shown. This type of panel will be referred to as Type-A assembled panel.

FIG. 2 and FIG. 2a illustrate another type A reflector-heat sink panel. It is essentially an integrated panel 5 comprising of plurality of miniature paraboloidal mirror surfaces 6, conductive heat collecting branches 7, miniature heat sink regions 8,, the base part of the integrated panel 5 which serves as a conductive heat collecting main, a heat transfer surface for transmitting heat to a heat absorbing medium 5a, and a transparent cover plate for admitting the Sun's rays into the panel (not shown in the figure). Again a paraboloidal mirror surface, a heat collecting branch and a heat sink region form a set. The unit shown in FIG. 2 will be referred to as a Type-A integrated panel. FIG. 3 shows another panel which is similar to that of FIG. 2, except that the sizes of the mirror surfaces, heat collecting branches, etc. have been reduced. FIG. 2 and FIG. 3 are shown together to illustrate that the amount of material needed for a panel to cover a given area decreases as the sizes are reduced. It is emphasized that miniaturization of the mirrors bring cost saving. Type A integrated panels may be manufactured by casing, die casting and injection molding operations followed by finishing of the mirror surfaces.

One may either use the front-side or the backside of the base part of an integral panel as the heat transfer surface for transmitting heat to a heat absorbing medium or provide one or more conduits to carry a heat absorbing medium and attach the conduits to the backside of the panel and insulate the resulting structure as illustrated in FIG. 4.

The mechanisms of concentrating and harvesting solar energy by all types of reflector-heat sink panels of the present invention are illustrated by FIG. 4. Referring to the figure, the Sun's rays enter the panel through a transparent cover plate 9, reflected by the focusing mirrors 10, which may be paraboloidal mirrors, longitudinal parabolic mirrors or longitudinal semiparabolic mirrors to be described, and are focused and intercepted by the miniature heat sink regions 11 to generate heat energy. The heat energy generated is transmitted down a conductive heat collecting branch 12, collected into a conductive heat collecting main 13 and finally transmitted to a heat absorbing medium in a conduit 14 through a heat transfer surface 13a, which is the surface of the conduit. The conduit and the main are insulated to prevent convective heat loss. In an embodiment, the panel is evacuated and the conduit and the main are insulated by an insulating material 15 to prevent convective heat loss. The mirror surfaces and the surfaces of heat collecting branches except for the heat sink regions are so made to have very high reflectivities and therefore very low emissivities ($e_m$, $e_b \approx 0$). High reflectivities and low emissivities of these surfaces are essential for low radiative heat losses from these surfaces and therefore are essential to a high collecting efficiency and to making heat available at a high temperature. The heat sink regions are made to have a very high absorptivity ($a_s \approx 1$), and therefore also has a very high emissivity ($e_s \approx 1$). One may simply make the regions black or form cavities in these regions to assure having a very high absorptivity. In another embodiment, the space between the transparent cover and the mirror surface may be used as a conduit carrying a heat absorbing medium. In this case, another transparent cover may be added in front of the original transparent cover and the space between the two transparent cover may be evacuated to minimize heat loss from the panel.

The present invention has several key features. Three of them are explained as follows:

1. Use of miniature focusing mirrors.

For Type A panels, it is preferrable to limit the diameter of the paraboloidal mirrors used, $W_A$, to less than 5.5 cm, and it may be advantageous to use mirrors smaller than 2.54 cm or even less than 1 cm in diameter (See FIG. 1). For Type B panels, it is preferrable to limit the width, $W_B$ (taken in the direction perpendicular to the longitudinal direction), of the longitudinal parabolic mirrors to less than 5.5 cm, and it may be advantageous to use mirrors with width less than 2.54 cm or even less than 1 cm. For Type C panels, it is preferrable to limit the width, $W_C$ (taken in the direction perpendicular to the longitudinal direction), of the longitudinal semiparabolic mirror to less than 5.5 cm, and it may be advantageous to use mirrors with width less than 2.54 cm or even less than 1 cm (See FIG. 13). The use of miniature mirrors in the panels of the present invention is in striking contrast with conventional solar energy collectors in which mirrors with very large diameter or width have been used.

2. Either the heat transfer surface is located on the backside of the focusing mirrors or the mirror surface and the surface of the conductive heat collecting branches are used as the heat transfer surface.

In a reflector-heat sink panel, there is a heat transfer surface to be in contact with a heat absorbing medium and to transmit the heat energy harvested from the Sun's rays to the medium. In one embodiment, this surface is located on the backside of the focusing mirrors. The word "backside" is used in the topological sense and will be further explained by examples. This feature is unique in the panels of the present invention. In another embodiment, the space separating the transparent cover and the mirror surfaces may be used to contain the heat absorbing medium. In this case, the surfaces of the mirrors and the conductive heat collecting branches are used as the heat transfer surface. In a conventional solar energy collector, heat absorbing medium with its containing vessel or tube is always placed in the focal region of the large focusing mirror.

3. Means of conductively transmitting heat energy from the heat sink regions to the heat transfer area of a panel.

As has been described, a panel has many focusing mirrors, and each mirror has its own focal region which serves as a heat sink region. Since heat is generated in the heat sink region, and since the heat is to be ultimately absorbed by the heat absorbing medium in contact with the heat transfer surface, which is located on the backside of the mirrors, there is a need for providing a means of transmitting heat from the heat sink regions to the heat transfer surface. This is accomplished by providing one or more conductive passages between the heat sink regions and the heat transfer surface. The conductive heat collecting branches and heat collecting main described earlier serves this purpose. In another embodiment, the mirror surfaces and surfaces of the conductive heat collecting branches are used as the heat transfer surface.

It has been described that a panel of the present invention can be used to accomplish concentrating and harvesting solar energy and provide heat at a high temperature. The reasons for these can be explained by referring to FIGS. 5 and 6. FIG. 5 illustrates a heat balance relation for a common solar energy collector for house heating, and FIG. 6 illustrates similar relation for a reflector-heat sink panel. Referring to FIG. 5, an insulated 19 gray body surface 17 of area A and having absorptivity, $a$, and emissivity, $e$, is intercepting solar energy at a rate, $R$ kw/m$^2$, and transmitting heat $q_3$ to a heat absorbing medium 18. The heat absorbed by the surface $q_1$, and the radiative heat loss by the surface $q_2$ can be shown as:

$$q_1 = R A a \quad (1)$$

$$q_2 = e \sigma A T^4 \quad (2)$$

where $\sigma$ is the Stefan-Boltzman constant and $T$ is the steady temperature assumed by the surface. Assuming that convective heat loss has been completely eliminated by a proper insulation and evacuation of the unit, the heat balance relation gives $$q_1 = q_2 + q_3 \quad (3)$$

Defining $q_3$ as the useful heat provided and defining $f_H = q_3/q_1$ as the heat utilization factor and substituting this and equations (1) and (2) into equation (3), one obtains:

$$(1 - f_H) R A a = e \sigma A T^4 \quad (4)$$

Since for a gray body surface $a = e$, the equation can be simplified as $$(1 - f_H) R = \sigma T^4 \quad (5)$$

For a given solar energy rate $R$, one can relate the steady surface temperature to the heat utilization factor. Since the temperature at which the useful heat $q_3$, is provided is closely related to the surface temperature, this equation may be interpreted to show the relation between the heat utilization factor and the temperature at which the useful heat is provided. Referring to FIG. 6, an ideally insulated and evacuated reflector-heat sink panel has $n$-mirrors, each having area of interception $A_I$, area of mirror $A_m$, area of conductive heat collecting branch $A_b$, and area of heat sink regions $A_s$. The solar energy intercepted by the mirror, $q_1$, and radiative heat loss, $q_2$, can be expressed as follows:

$$q_1 = n R A_I a_s \quad (6)$$

$$q_2 = n e_m \sigma A_m F_m T_m^4 + n e_b \sigma A_b F_b T_b^4 + n e_s \sigma A_s F_s T_s^4 \quad (7)$$

where $F_m$, $F_b$, and $F_s$ are geometric factors and $e_m$, $e_b$, and $e_s$ are emissivities of the mirrors, branches and sinks respectively. For simplicity, $F_m$, $F_b$, $F_s$ and $a_s$ may be assumed to be 1 and $e_m$ and $e_b$ may be assumed to be equal. A heat balance gives $$q_1 = q_2 + q_3 \quad (8)$$

Defining $f_H = q_3/q_1$, the heat utilization factor, and substituting this relation, the simplified assumptions and equations (6) and (7) into equation (8), one obtains $$(1 - f_H) R = \sigma \frac{e_m A_m}{A_I} T_m^4 + \sigma \frac{e_b A_b}{A_I} T_b^4 + \sigma \frac{e_s A_s}{A_I} T_s^4 \quad (9)$$

For an integrated panel, $T_m$ and $T_b$ may be assumed to be equal to $T_s$, then the above equation becomes $$(1 - F_H) R = \sigma \left( \frac{e_m A_m}{A_I} + \frac{e_b A_b}{A_I} + \frac{e_s A_s}{A_I} \right) T_s^4 = \sigma f_{EA} T_s^4 \quad (10)$$

For a given solar energy rate R, this equation relates the heat sink temperature to the heat utilization factor. Again, since the temperature at which the useful heat $q_3$ is provided is closely related to the sink temperature, this equation may be interpreted to show the relation between the heat utilization factor and the temperature at which the useful heat is provided. By comparing equations (5) and (10), it is seen that equation (10) has an extra factor, $f_{EA} = 1/A_I (e_m A_m + e_b A_b + e_s A_s)$. This factor may be very small compared with 1, since $e_m$ and $e_b$ are very small and $A_s$ can be made very small compared with $A_l$. Comparing equations (5) and (10) again, for a given utilization factor, $T_s > T$ and heat can be provided at a higher temperature by using a reflector-heat sink panel than by using a common solar energy collector for house heating. Conversely, to provide heat at a given temperature, a larger heat utilization can be obtained by using a reflector-heat sink panel. When an assembled panel is used, $T_m$ and $T_b$ may be maintained at lower values than $T_s$ and even more favorable solar energy collection can be accomplished.

Figure 7:
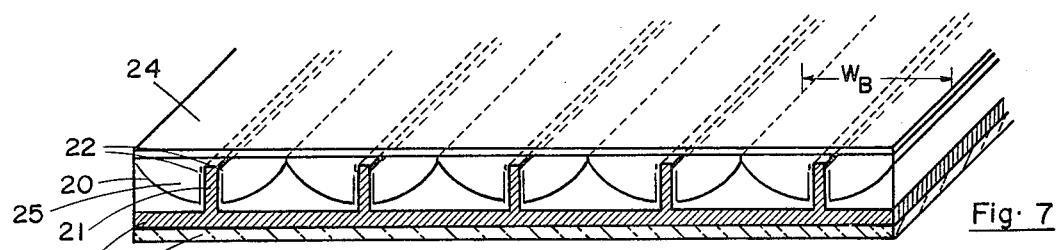
FIGS. 7 and 8 illustrate reflector-heat sink panels with miniature longitudinal parabolic mirrors and heat collectors. In the unit of FIG. 7, miniature longitudinal parabolic mirrors, conductive heat collecting branches and a conductive heat collecting main are made separately and are then assembled in place. In the unit of FIG. 8, the mirrors and heat collectors are made as a one-piece unit.

I-B Reflector-Heat Sink Panels with Longitudinal Parabolic Mirrors — Type B Panels FIG. 7 illustrates a Type B assembled reflector-heat sink panel. It comprises of multitude of miniature longitudinal parabolic mirrors 20, longitudinal conductive heat collecting branches 21, miniature longitudinal heat sink regions 22 which are on the heat collecting branches and are also the focal regions of the mirrors, a conductive heat collecting main 23, a transparent cover for admitting the Sun's rays 24, a heat transfer surface for transmitting heat to a heat absorbing medium (not shown in the figure), and a layer of insulation 26. The space within the panel 25 may be evacuated to minimize convective heat loss, and the panel has to be properly sealed for the evacuation. In another embodiment, the space within the panel 25 may be used to carry a heat absorbing medium. Then another transparent cover may be added in front of the original cover and the space between the two transparent covers may be evacuated to minimize heat loss. A longitudinal parabolic mirror is herein defined as a longitudinal mirror which has a parabolic cross-section taken in the direction perpendicular to the longitudinal direction of the mirror.

Figure 8:
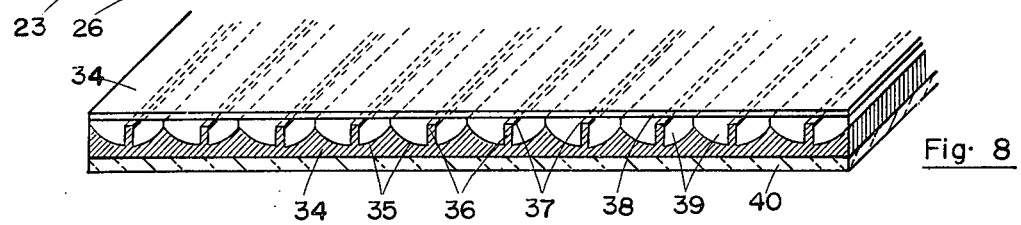

FIG. 8 illustrates a Type B integrated reflector-heat sink panel. The construction is similar to that illustrated in FIG. 7, except that the mirrors, the branches and the main are integrated. It comprises of miniature longitudinal parabolic mirror surfaces 35, an integrated heat collector 34 consisting of a heat collecting main and heat collecting branches 36, heat sink regions 37, a transparent cover 38, a heat transfer surface (not shown in the figure), and a layer of insulation. The spaces within the panel 39 may be evacuated to minimize convective heat loss and the panel has to be properly sealed for the evacuation. As has been described, the spaces within the panel 39 may be used to carry a heat absorbing medium and another evacuated space may be added to minimize heat loss.

Figure 9:
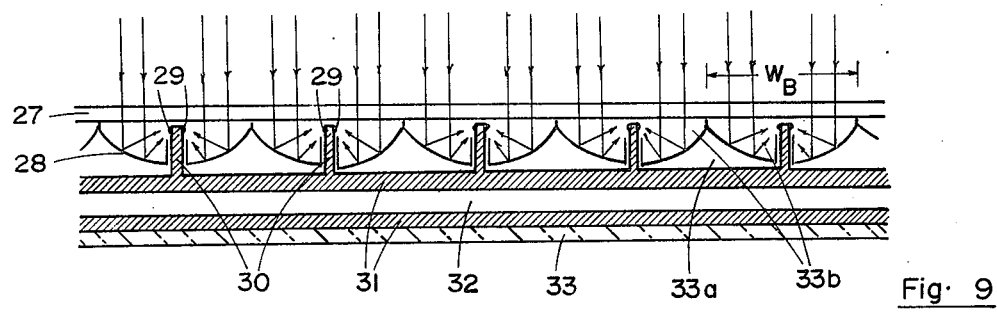
FIGS. 9 and 10 illustrate the mechanism of solar energy concentration and harvesting in these units.
Figure 10:
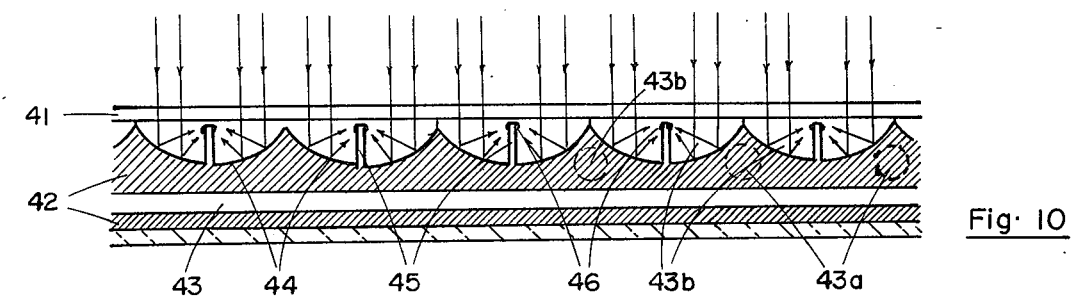

Referring to FIGS. 9 and 10, which respectively illustrate a Type B assembled panel and a Type B integrated panel, the mechanisms of concentrating and harvesting solar energy in a Type B panel may be explained as follows:

The Sun's rays are admitted through transparent covers 27 and 41, reflected by longitudinal parabolic mirrors 28 and 44, focused and intercepted by longitudinal heat sink regions 29 and 46. The heat generated in the heat sink regions is transmitted through conductive heat collecting branches 30 and 45 into heat collecting mains 31 and 42 to a heat transfer surface which forms at least a part of the wall of a conduit carrying a heat absorbing medium 32 and 43, thereby to transmit the heat to the medium.

Referring to FIG. 9, in a Type B-assembled panel, one may use the spaces in front of the mirrors and/or behind the mirrors 33a and 33b as conduits carrying a heat absorbing medium. In such cases, one or more of the following surfaces may serve as heat transfer surfaces for transmitting heat to the heat absorbing medium: front and back surfaces of the mirrors, surfaces of conductive heat collecting branches and the upper surfaces of the heat collecting main. Referring to FIG. 10, in a Type B-integrated panel, one may provide conduits 43a for carrying a heat absorbing medium behind the mirror surfaces. Then the conduit surfaces serve as the heat transfer surface. As has been described, one may also use the spaces in front of the mirror surfaces 43b for carrying a heat absorbing medium.

Figure 11:
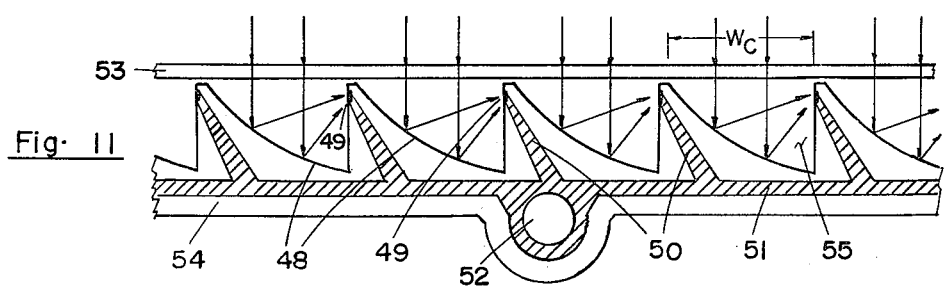
FIG. 11 illustrates a reflector-heat sink panel in which miniature longitudinal semiparabolic mirrors and conductive heat collectors are separately made and put in place. It also illustrates the mechanisms of concentrating and harvesting solar energy.
Figure 12:
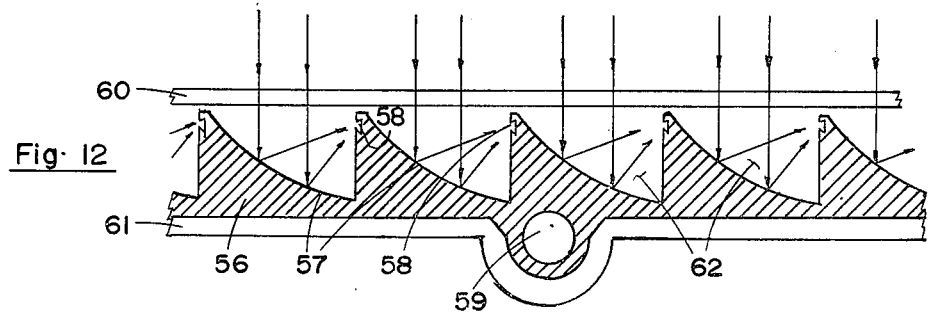
FIG. 12 illustrates a similar unit, except that the mirrors and conductive heat collectors are made into an integrated unit and that the heat sink regions are shown to be made of cavities to enhance their absorptivities.

I-C Reflector-Heat Sink Panels with Longitudinal Semiparabolic Mirrors — Type C Panels FIG. 11 and FIG. 12 respectively illustrate a Type C assembled panel and a Type C integrated panel. The constructions of these two panels are respectively similar to those of FIGS. 7 and 8. A Type C panel differs from a Type B panel is using longitudinal semiparabolic mirrors instead of longitudinal parabolic mirrors. A longitudinal semiparabolic mirror is herein used to mean a longitudinal mirror which has a semiparabolic cross section taken in the direction perpendicular to the longitudinal direction.

Referring to FIGS. 11 and 12, the mechanisms by which a Type C panel concentrate and harvest solar energy may be explained as follows:

The Sun's rays are admitted to a Type C panel through a transparent cover 53 and 60, reflected and focused by longitudinal semiparabolic mirrors 48 and 57, intercepted by longitudinal heat sinks 49 and 58 and are converted into heat energy. In FIG. 11, the heat so generated is transmitted through conductive heat collecting branches 50 into a conductive heat collecting main 51 and to a heat transfer surface which is in contact with a heat absorbing medium 52. In FIG. 12, the heat generated in the heat sinks passes through an integrated heat collector 56 to a heat transfer surface which is in contact with a heat transfer medium 59. The spaces in the panels 55 and 62 may be evacuated to minimize convective heat losses and the panels are insulated on the backside 54 and 61. Another way is to use the spaces in front of mirror surfaces, 55 and 62 to carry a heat absorbing medium and add an evacuate space in front of the original transparent cover to minimize heat losses.

Figure 13:
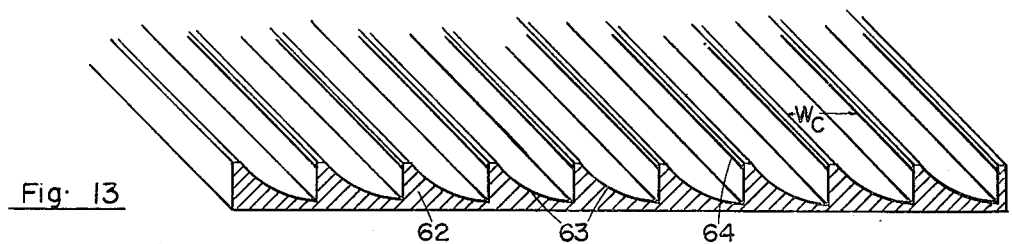
FIGS. 13, 14 and 15 illustrate integrated panels with successively smaller mirror sizes to show that, as the size of the mirror is reduced, the amount of material needed in the construction can also be reduced.
Figure 14:
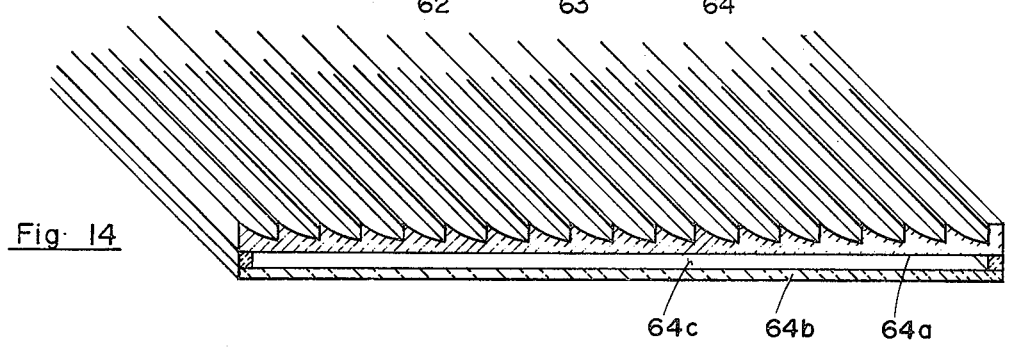
Figure 15:
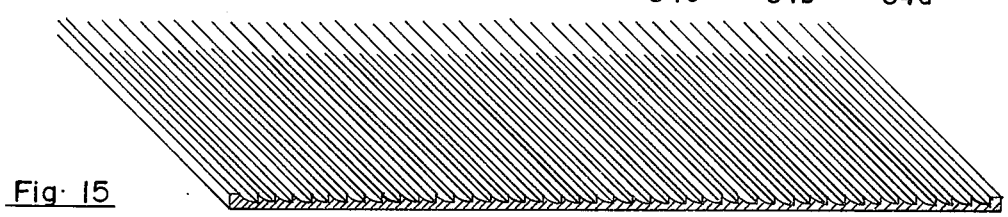

FIGS. 13, 14 and 15 illustrate integrated mirror heat collector plates of successively smaller sizes to illustrate saving in material as the size is reduced. Referring to FIG. 13, a Type C integrated mirror-heat collector plate 62 has longitudinal semiparabolic mirror surfaces 63 and focal regions which also serve as heat sink regions 64.

Various ways of manufacturing Type C panels are illustrated in FIGS. 11 through 19. Integrated mirror-heat collector plates illustrated by FIGS. 12, 13, 14, 15, 18 and 19 can be made by an extrusion operation. One may extrude a metal into the desired configuration and finish the surfaces into mirror surface. One may also extrude a material, metal, plastic, foam plastic et., into the desired configuration and then attach a thin layer of reflecting material such as metalized plastic film to provide the desired reflecting surfaces. Aluminized Mylar film is available commercially. Mirrorlite manufactured by Kamar Products, Inc. under licenses from British Aircraft Corporation can also be used for this purpose. The panel illustrated by FIG. 11 can be made by first forming the unit containing the heat collecting branches 50, heat collecting main 51 and the conduits 52 by a metal extrusion operation, and starting from a polished metal or metalized plastic sheet and forming it into the mirrors and the connecting vertical walls and put the tow units together. The panels illustrated by FIGS. 16 and 17 can be made by a sheet forming process. For example, one may start from a pure aluminum sheet, buff the surface, and either chemically polish or electropolish the surface to obtain a polished metal sheet. This polished metal sheet is formed into the shape shown in FIGS. 16 and 17 to provide the mirror surfaces and the connecting vertical walls. Most of the manufacturing methods described in connection with Type C panels can be used in manufacturing Type B panels.

Figure 16:
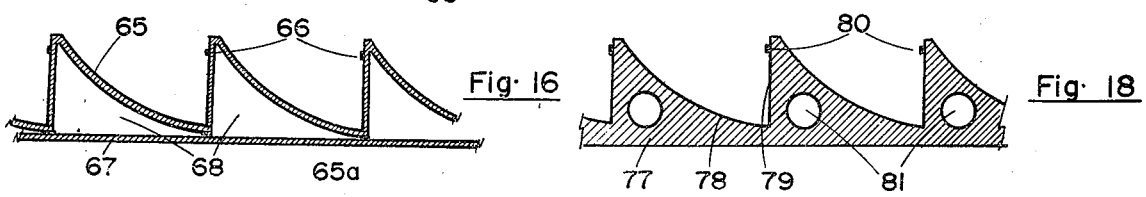
FIGS. 16 and 17 show that integrated units can be made from a polished metal sheet and by pressing or other forming operations. They also show that the void spaces formed between mirrors and the back-up plate may be used to contain and carry a heat absorbing medium.
Figure 18:
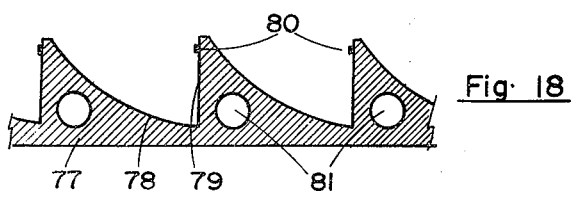
FIGS. 18 and 19 illustrate reflector-heat sink panels that can be manufactured by an extrusion operation. They also show that conduits for carrying a heat absorbing medium may be provided just behind the mirror surfaces and be provided during the extrusion operation. The heat sink regions shown in FIGS. 17 and 19 are made of longitudinal cavities with proper openings.
Figure 19:
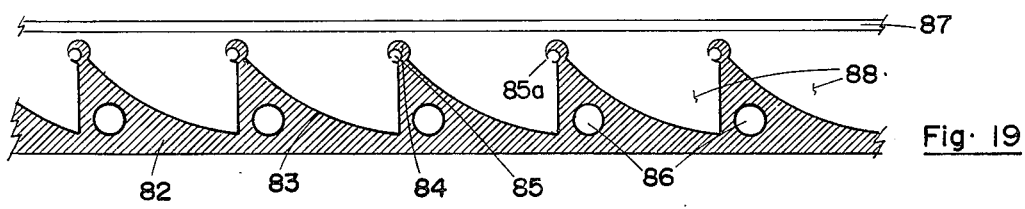

Various ways of providing a heat transfer surface to transmit heat to and a conduit to contain a heat absorbing medium are illustrated in FIGS. 11, 12, 14, 16 and 18. As shown in FIG. 14, the backside 64a of an integrated mirror-heat collector plate may be used as a heat transfer surface and be used with another wall 64b to provide a conduit 64c to contain a heat absorbing medium. One may provide a separate conduit 52 and 59 in contact with a heat collecting main as shown in FIGS. 11 and 12. The surface of the conduit is the heat transfer surface. One may also provide conduits behind mirror surfaces in an integrated mirror-heat collector plate as shown in FIGS. 18 and 19. Referring to FIG. 18, such an integrated mirror-heat collector plate 77, has mirror surfaces 78, vertical walls 79, heat sink regions 80 and heat absorbing medium conduits 81. It has been described that the panels illustrated by FIGS. 16 and 17 can be made by a sheet forming operation. Referring to FIG. 16, it has a polished metal sheet formed to provide mirror surfaces 65, connecting vertical walls, heat sinks 66 and a back-up plate 67. The spaces behind the mirrors 68 may be used to contain a heat absorbing medium. In this case, the back surfaces of the mirrors and the vertical walls are used as a heat transfer surface to transmit heat to the heat absorbing medium. As has been described, yet another way is to use the spaces, 55 and 62, between the transparent cover and the mirror surfaces to contain a heat absorbing medium.

Figure 17:
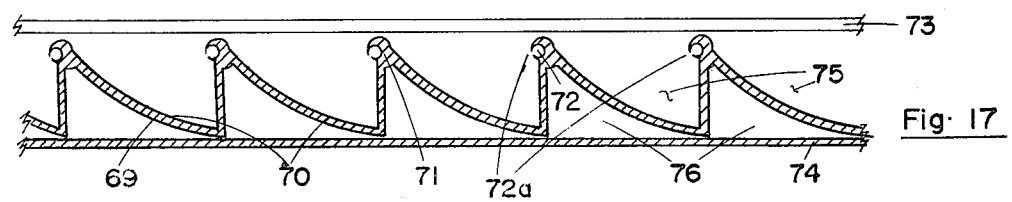

The heat sink regions shown in the panels of FIGS. 12, 17 and 19 are shown to be made of cavities with proper openings. It is well known that a cavity with a small opening may be considered as a black body and has an absorptivity almost equal to 1 basing on the area of the opening. When such a heat sink is used, $a_s$ and $e_s$ of the heat sinks may be considered as 1. The inside of each cavity may be blackened to further increase its absorptivity. This cavity-type heat sinks may also be used in Type A and Type B panels. Heat sink regions may also be made by simply blackening the regions.

The panel illustrated by FIG. 17 comprises of a transparent cover 73, a first metal sheet 69 so formed to provide semiparabolic mirror surfaces 70, connecting vertical walls, heat sink regions 71 comprising of cavities 72 and openings 72a. The spaces 76 between the first metal sheet and the second back-up sheet 74 may be used to carry a heat absorbing medium, and the spaces 75 between the first metal sheet and the cover may be evacuated to minimize convective heat loss. The back side of the back-up sheet has to be insulated. The panel illustrated by FIG. 19 differs from that of FIG. 18 in having cavities 85 and opening 85a in the heat sink regions 84. The spaces below the cover 88 may be evacuated and the conduits 86 are to carry a heat absorbing medium. The spaces 75 and 88 in FIGS. 17 and 19 may also be used to carry a heat absorbing medium.

It has been described that one of the key features of a reflector-heat sink panel of the present invention is either to place the heat transfer surface of transmitting heat to a heat absorbing medium on the backside of the focusing mirrors or to use the mirror surfaces and surfaces of the conductive heat collecting walls as the heat transfer surface. Various ways of placing the heat transfer surface in a panel have been illustrated by FIGS. 4, 6, 9, 10, 11, 12, 14, 16, 17, 18 and 19. In all these cases, the presence of the heat transfer surface has minimum or no effect for the light rays to shine on the mirror surfaces.

It is noted that the use of semiparabolic mirrors is unique in this invention. It is believed that no one has used a semiparabolic mirror for solar energy collection. The use of semiparabolic mirrors is important because some manufacturing methods can be conveniently applied to Type C panels only. For example, the sheet forming method illustrated by FIGS. 16 and 17 and extrusion method by FIGS. 18 and 19 work best for Type C panels and less so for Type B panels and are not applicable for Type A panels. It is also noted that a full advantage of miniaturization should be taken. As long as a cost saving can be realized, one should not hesitate in miniaturizing the mirrors and the heat sinks.

In operation, a reflector-heat sink panel may be installed on an axis tilted from the ground at a certain angle and be turned on its tilted axis at the rate of 15° of arc per hour so that the Sun will always shine into the mirrors with a minimum of loss. This type of installation will be referred to as the swing-type installation. The swing-type installation can be applied to all types of reflector-heat sink panels described. For Type B and Type C panels, however, a non-swinging type installation can also be applied. This non-swinging type installation is illustrated by FIG. 20. Referring to the figure, a reflector-heat sink panel is so installed that the Sun's rays shine into a section 91 of a longitudinal parabolic mirror 89 of the panel in the direction 94 at one time and in the direction 93 at another time. The focal regions which are also the heat sink regions are illustrated as 90. As illustrated in the figure, all the Sun's rays can be focused into the heat sink regions 90 by a proper installation of the panel. As shown in the figure, rays 94 and 93 are respectively reflected into 95 and both are in the heat sink regions. Depending on the costs of the panels and the swinging mechanisms, it may be advantageous to use the non-swinging type installation. This situation may apply particularly well to house installations.

I-D Narrow Reflector-Heat Sink Panels

FIGS. 21 and 22 illustrate two types of narrow reflector-heat sink panels, which are particularly useful in the multiple focusing method for a high degree concentration of solar energy to be described in Section III. The narrow panel illustrated in FIGS. 21a and 21b is a Type C panel. It has a conduit containing a heat absorbing medium 96, a narrow integrated mirror-heat collector 97 containing multitude of short longitudinal semiparabolic mirrors 98 and their heat sink regions 100. The narrow panel illustrated in FIGS. 22a and 22b is a Type B panel. It also has a conduit containing a heat absorbing medium 101, a narrow integrated mirror-heat collector 102 which contains multitude of short longitudinal parabolic mirrors 103 and their heat sink regions 104. When a narrow band of parallel rays shine directly into the mirrors of either one of these panels, the rays are reflected and focused by the mirrors and intercepted by the heat sinks and converted into heat, and the heat is transmitted to the heat absorbing medium. A narrow reflector-heat sink panel is particularly useful in concentrating a narrow band of concentrated rays and harvesting the energy. A narrow panel may be contained in a silvered glass tube to minimize convective and radiative heat losses.

II. Flattened Focusing Mirrors

Referring to FIG. 23, sections 105-106-107-108-109 shows a cross-section of either a conventional parabolic mirror or a conventional longitudinal parabolic mirror, surface 106-107-108 represents the mirror surface point 120a represents either the focus or the focal line. A coated steel pipe 120 and a glass vacuum pipe 119 are placed around the focus or the focal line and a heat absorbing medium is passed within the coated steel pipe. Glass vacuum pipe is silvered inside except for small clear windows 121 to admit the Sun's rays. When Sun's rays fall on the mirror parallel to the optical axis, 120a–107, of the mirror, the rays are reflected and proceed toward the focus 120a. The rays pass through the small clear windows provided in the glass vacuum pipe and are absorbed by the surface of the coated pipe and thereby become heat energy and are ultimately absorbed by the heat absorbing medium.

The present invention is primarily related to a modification of the conventional mirrors. It is to flatten the conventional mirrors into thin mirrors which perform the same functions. Referring again to FIG. 23, a cross-section of this new flattened parabolic mirror is shown as 105–111–107–110–109. It is seen that a flattened parabolic mirror has multiplicity of narrow mirrors assembled in correct relationship so that most of the light rays which come toward the mirror in the direction parallel to the optical axis are reflected by the narrow component mirrors and are directed toward the focal point or focal line. The proper orientation of each component narrow mirror can be determined by the Law of Reflection. For example, the slope of the narrow component mirror 116–117 can be determined as follows: (a) locate midpoint 113 on the mirror, (b) draw line 120a—113, (c) draw a line 112–113 parallel to the optical axis 120a–107, (d) draw the line which bisect angle 112–113–120a, and name it as line 113–115, and (e) the mirror surface 116–117 is made perpendicular to the line 113–115. Similar procedures can be followed in determining the orientations of all the remaining narrow component mirrors. It is noted that some of the incident parallel rays falling on the mirror are not reflected to the focus and are therefore lost. Such regions of the mirrors are the regions illustrated as 118 in the figure.

Corresponding respectively to a conventional paraboloidal mirror and a conventional longitudinal parabolic mirror, one may make a flattened paraboloidal mirror and a flattened longitudinal parabolic mirror. FIG. 25 shows a horizontal view 122 and a vertical view of a cross-section of a flattened paraboloidal mirror of the present invention and FIG. 26 shows a horizontal view 123 and a vertical view of a cross-section of a flattened longitudinal parabolic mirror of the present invention.

FIG. 24 illustrates a mirror that is similar to that illustrated by FIG. 23, except that the sizes of the component narrow mirrors are smaller. It is noted from these figures that the cross-sectional areas for a given area for receiving Sun's rays decreases as the size of a component narrow mirror decreases. Consequently the material needed to construct a mirror to cover a given area decreases. A low cost solar energy collector can be made by using a flattened parabolic mirror made of small component mirrors.

A flattened parabolic mirror may be made as a one piece unit or as a composite unit. A longitudinal parabolic mirror may be made in many ways. Referring to FIG. 27, one way is to extrude or cast a metal into a shape having a desired cross-section and polish the narrow strips into a component narrow mirror. Another way is to extrude or cast either a metal or a plastic into a shape of a desired cross-section and attach a layer of reflecting material. Metals that may be used include aluminum and its alloys, copper and its alloys, silver and its alloys, and gold and its alloys. Many plastic materials can be used as supporting base to which a reflecting material may be attached to form a flattened parabolic mirror. A polyurethane foam is probably one of the best materials for this purpose. Aluminized Mylar plastic film, polished aluminum foil, polished silver foil and polished gold foil may be used as reflecting material to be attached to the base structures described. Glassless mirror made by Kamar Products, Inc., New York and marketed under trade name "Mirrorlite" may be used as reflecting material. FIG. 28 illustrates another way. One starts with a sheet metal, such as pure aluminum, buffs the surface and chemically polishes or electropolishes the surface to obtain a bright aluminum sheet. One then applies a pressing operation with surface protection to obtain a flattened parabolic mirror. FIG. 29 still illustrates another way. One obtains a bright metal sheet and applies an operation to form a louver with the desired orientation of the metal surface. This also gives a flattened parabolic mirror.

Referring to the figures, each component narrow mirror has two edges — the first edge being relatively higher than the second edge with reference to the direction of the focal axis. For conveniences in manufacture and handling, it is desirable to limit this difference in the heights of the two edges of each component mirror to less than 3 cm and preferrable to limit it to less than 1 cm.

III. Multiple Focusing Method for Accomplishing High Degree Concentration of Solar Energy A solar energy concentration has conventionally been accomplished by the use of a parabolic mirror or a Fresnel lens. To accomplish a high degree concentration, the size of the focusing mirror or focusing lens has to be large. It is very expensive to build and install a large focusing mirror or a large focusing lens. The present invention introduces two types of multiple focusing methods which will be referred to as type-A method and type-B method and are illustrated by FIG. 34 and FIG. 35 respectively. Referring to FIG. 34, in a type-A method, a band of the Sun's rays having a rectangular wave front 160, $x_o$ and $y_o$ in the two perpendicular directions $x$ and $y$, is processed by a first converting device into a narrow band of parallel rays with a wave front narrowed in the $x$-direction, $x_1$ and $y_0$. This narrowed band of concentrated rays is processed by a second converting device into one or more bands of very concentrated rays, narrowed in the y direction 162. Referring to FIG. 35, in a type B method, a band of the Sun's rays having a very wide wave front 163, $6x_o$ and $y_o$ in the two perpendicular directions x and y, is processed by a first converting device into several narrow and separated bands of parallel rays 164 with wave fronts narrowed in the x-directions, each band having dimensions $x_1$ and $y_o$. These narrow bands of parallel and concentrated rays are brought close together into a big band of parallel and concentrated rays 165, having dimensions $y_o$ and $\Sigma x_1$, and is processed by a second converting device into a narrow band of parallel and very concentrated rays 167. Type B method may be modified to eliminate the collection step. Such a method will be referred to as a type-B modified method.

Examples of a type-A methods are illustrated by FIGS. 30 and 31. Referring to FIG. 30, the Sun's parallel rays of width $2W_o$, 131a and 131b, are intercepted by two focusing mirrors such as regular or flattened longitudinal parabolic mirrors, 128a and 128b, and are reflected and converged toward their focal lines, 132a and 132b, and are converted back into two narrow bands of concentrated parallel rays of width $W_1$ each, 133a and 133b. In order to convert a wide band of parallel rays, 131a or 131b, into a narrow band of concentrated rays, 133a or 133b, the focal line of each of the large focusing mirrors, 128a or 128b, and the focal line of each corresponding diverging mirror, 130a and 130b, have to coincide. In other words, 132a should be the focal lines for mirrors 128a and 130a at the same time, and 132b should be the focal lines for mirrors 128b and 130b at the same time. These two narrowed bands of concentrated parallel rays 133a and 133b are intercepted, concentrated and harvested by two narrow reflector-heat sink panels, 129a and 129b, described in Section I-D. Referring to FIG. 31, the Sun's parallel rays are converged toward the focal lines of Fresnel lenses, 138a through 138c, by the lenses, 135a through 135c. The converged rays are converted back into three narrow bands of parallel and concentrated rays, 139a through 139c, by three small diverging mirrors, 136a through 136c, and the narrow bands of parallel rays are intercepted, concentrated and harvested by three narrow reflector-heat sink panels, 137a through 137c, described in Section I-D. The small concave mirrors, 130a, 130b, 136a through 136c, may be replaced by convex mirrors or lenses properly placed.

Type B double focusing methods are illustrated by FIGS. 36 and 38. Type B modified double focusing methods are illustrated by FIGS. 37 and 39. The system illustrated by FIG. 36 has four primary longitudinal focusing mirrors, such as regular or flattened longitudinal mirrors, 168a through 168d, four small concave mirrors, 169a through 169d, placed at proper places in the vicinities of the focal lines of the primary mirrors, small planar mirrors, 170a through 170d and 171a through 171d, a parabolic mirror 172 for final concentration and a final heat absorbing conduit 173. It is noted that a type B or a type C reflector-heat sink panel may be used to replace the parabolic mirror 172 and the final absorbing conduit 173. It is also noted that small convex mirrors or lenses may be used in place of the small concave mirrors in converting the converged rays back into narrow bands of parallel and concentrated rays. In operation, the Sun's rays are intercepted by the primary parabolic mirror 168a through 168d and are reflected by them and proceed towards their respective focal lines and are again intercepted and reflected by the small diverging mirrors 169a through 169d to become narrow bands of parallel and concentrated rays. These narrow bands of parallel and concentrated rays are redirected by small planar mirrors 170a through 170d and 171a through 171d to become a group of parallel rays proceeding to one direction and are intercepted by a parabolic mirror 172 and focused by it. The focused light rays are intercepted by the final absorbing surface, the surface of conduit 173, and the heat generated at the absorbing surface is transmitted to the heat absorbing medium contained in the conduit 173. As has been described a Type B or a Type C reflector-heat sink panel may be used to replace the final parabolic mirror 172 and the heat absorbing conduit 173. Referring to FIG. 37, the Sun's parallel rays are intercepted by focusing mirrors 174a through 174d, reflected by them and converge toward their respective focal lines and are converted back into narrow bands of parallel rays by small diverging mirrors 175a through 175d. These narrow bands of parallel rays are reflected first by planar mirrors 176a through 176d and are further reflected and redirected by properly oriented planar mirrors 177a through 177d to go through a window 179 provided on a silvered and evacuated glass tube 178 and finally intercepted and absorbed by the absorbing surface provided on the conduit 180, and the heat generated at the absorbing surface is finally transmitted to heat absorbing medium contained in the conduit 180. The conduit 173 shown in FIG. 36 may also have a composite structure of a silvered and evacuated glass tube and a conduit tube. The system illustrated by FIG. 36 has some advantages over the system illustrated by FIG. 37. These are that while the mirrors 171a through 171d are oriented in the same direction, the mirrors 177a through 177d have to be properly and differently oriented, and that probably more area can be covered and a higher collecting efficiency can be attained by the system illustrated by FIG. 36.

The systems illustrated by FIGS. 38 and 39 are respectively similar to the systems illustrated by FIGS. 36 and 37, except that Fresnel lenses are used instead of parabolic mirrors. Referring to FIG. 38, the Sun's parallel rays are intercepted by primary Fresnel lenses 181a through 181d and are converged toward the focal lines of the lenses and are converted back into narrow bands of parallel and concentrated rays by such devices as small parabolic mirrors 182a through 182d. These narrow bands of parallel and concentrated rays go through central planar parts of the primary lenses and are reflected and redirected to one direction by small planar mirrors 183a through 183d. The narrow bands of parallel rays so directed are intercepted and focused again by such a device as a Fresnel lens 184, pass through the window 186 provided on a silvered and evacuated glass tube 185, and finally absorbed by an absorbing surface provided on a conduit 187 carrying a heat absorbing medium. The heat generated at the absorbing surface is finally transmitted to the absorbing medium. As noted with the system of FIG. 36, a Type B or a Type C reflector-heat sink panel may be used to replace the final focusing Fresnel lens 184 and the heat absorbing tube assembly 185 and 187. The process illustrated by FIG. 39 will be obvious from those given for FIGS. 36, 37 and 38. Therefore, a detail description is omitted. Suffice it to say that the system comprises of focusing lenses 188a through 188d, small diverging mirrors 189a through 189d, small directing mirrors 190a through 190d, a silvered and evacuated glass tube 191 with a window 192 and a heat absorbing tube 193.

By referring to FIGS. 37 and 39, it is noted that in the Type B modified double focusing method, paraboloidal mirrors, flattened paraboloidal mirrors, circular lenses and circular Fresnel lenses may be used for the first focusing step. By referring to FIGS. 36 and 38, it is noted that in the Type B double focusing method, the use of longitudinal mirrors, longitudinal flattened mirrors, longitudinal lenses and longitudinal Fresnel lenses is preferred to the use of the circular optical devices.

IV A Converging Lens--Heat Sink Panel

A converging lens-heat sink panel comprises of an integrated converging lens plate, a special heat sink plate, a conduit for carrying a heat absorbing medium, and means of insulating the unit. An integrated converging lens plate contains myriads of focusing lenses of relatively short focal length and these lenses are integrated to form a continuous plate. The first surface of a special heat sink plate has myriads of miniature heat sink areas with high absorptivities and the remaining and major part of the first surface is a reflective surface. In a converging lens-heat sink panel, an integrated converging lens plate and s special heat sink plate are so placed that a miniature heat sink area of the heat sink plate lies in the focal region of a converging lens of the integrated converging lens plate. A conduit for carrying a heat absorbing medium may be provided so that either the first surface or the second surface of the special heat sink plate is in contact with the heat absorbing medium. Several types of converging lens-heat sink panels are illustrated by FIGS. 32, 33 and 33a. These figures show cross-sectional views of the panels.

Referring to FIG. 32, the panel illustrated has an integrated converging lens plate 140, a special heat sink plate 141, a conduit for carrying a heat absorbing medium 142 and a layer of insulation 154. As shown in the figure, the integrated converging lens plate has many component converging lenses, 140a through 140g. The first surface of the special heat sink plate 141, has miniature heat sink regions, 151a through 151g, and the remaining area of the first surface 152 has a very high reflectivity and therefore a very low emissivity. In this panel, this reflective area is shown to be made of an insulating material 154. The spacing between the integrated converging lens plate 140 and the special heat sink plate 141 is so adjusted that the heat sink regions, 151a through 151g, respectively lie at the focal regions of the component converging lenses, 140a through 140g. The space separating the two plates 143 may be evacuated to minimize heat loss. In operation, the Sun's parallel rays are intercepted by the component lenses, 140a through 140g and are converged to the respective miniature heat sinks, 151a through 151g, and generate heat in the heat sink regions. The heat so generated passes through conductive heat collecting branches 153 and to the walls 150 of the conduits 142 and is transmitted to the heat absorbing medium contained therein.

The panel illustrated by FIG. 33 is very similar to that of FIG. 32, except in some detal construction of the heat sink plate. The panel has an integrated converging lens plate 145, a special heat sink plate 146, a conduit for carrying a heat absorbing medium 147. The first surface of the heat sink plate which faces the lens plate has myriads of miniature heat sinks, 156a through 156g, and the rest of the surface 158 is highly reflective regions. These reflective regions are made of a conductive material and are in heat communication with the miniature heat sinks. A heat sink plate of this type can be produced at a relatively low cost compared with that of the panel of FIG. 32. In operation, the Sun's parallel rays are converged into the heat sink regions, 156a through 156g, by the component lenses, 155a through 155g, and the heat generated in the heat sinks is transmitted to the heat absorbing medium. The radiative heat loss from the reflective regions of this panel is higher than that of the panel of FIG. 32, because the temperature of the reflective regions in this panel is higher than that of the panel of FIG. 32.

The panel illustrated by FIG. 33a is different from those of FIGS. 32 and 33 in the way a conduit for carrying a heat absorbing medium is provided. In this panel, the space separating the first surface of the heat sink plate and the integrated converging lens plate is used as the conduit. Referring to this figure, the panel has an integrated converging lens plate 194, a special heat sink plate 195, a conduit for carrying a heat absorbing medium 197, which is provided by the space separating the lens plate and the heat sink plate and a layer of insulation 198. An additional transparent cover 199 is provided in the panel and the space 200 separating this cover and the lens plate may be evacuated to minimize heat loss. The construction of the heat sink plate is similar to that of the panel illustrated by FIG. 33. In operation, the Sun's parallel rays pass through the cover 199, intercepted and converged by the component lenses 194 and are intercepted by the properly located heat sinks, 196a through 196g. The heat generated spreads over the heat sink plate and is transmitted to the heat absorbing medium through the first surface of the heat sink plate.

A note has been presented in Section I-C regarding to ways of installing reflector-heat sink panels. Similar note can be presented for ways of installing converging lens-heat sink panels. Suffice it to say that, when the component miniature lenses of a panel are circular lenses, the swing-type installation should be used; when the component lenses are longitudinal lenses, both the swing-type and non-swing type installations can be used. It is noted that it is desirable to use relatively small component lenses with relatively short focal length, because then the weight of the lens plate will be small and the spacing between the lens plate and the heat sink plate will be short. It is desirable to limit the focal length to less than 10 cm and preferable to limit it to less than 5 cm. It is also desirable to limit the size of component lenses, $W_L$, shown in FIGS. 32, 33 and 33a, either the diameter of a circular component lens or the maximum dimension of a cross-section of a component lens taken in the direction perpendicular to the longitudinal direction, to less than 10 cm, and is preferable to limit it to less than 5 cm. It is further noted that a lens plate with Fresnel lenses as component lenses can also be used.

V Methods of Storing Heat Energy

It has been described that in the Sun-heated Dover house, $Na_2SO_4 10H_2O$ has been used for heat storage. Other substances that have been suggested have been presented in Table 1 earlier. It is noted the melting points of these substances fall in the range of 80°F to 126°F, or 27°C to 52°C. Since the methods of concentration and harvesting disclosed in this application enable providing heat energy at higher temperatures, a substance with a higher melting point has to be used as the heat storing medium. Some substances of interest are ammonium bisulfate (m.p. 146.7°C), potassium bisulfate (m.p. 214°C), sodium chloride (m.p. 248–261°C), sodium oleate (m.p. 232–235°C), sodium orthophosphate (m.p. 100°C), sulfur (m.p. 112.8°C), sodium palmitate (m.p. 270°C), potassium dihydrogen orthophosphate (m.p. 252.6°C), potassium stearate (m.p. 153°C), sodium perchlorate (m.p. 130°C), aluminimum stearate (m.p. 103°C), calcium chloride monohydrate (m.p. 260°C), calcium stearate (m.p. 180°C), ferric chloride (m.p. 306°C), magnesium nitrate dihydrate (m.p. 129°C). Substances which undergo reversible chemical reactions can also be used as heat storing media.

What we claim as our invention and desire to secure by Letters Patent is:

1. A panel collector for intercepting and concentrating solar rays and harvesting the energy of the solar rays as thermal energy comprising of an integrated reflector-heat sink-heat transfer surface panel having a front side and a back side which comprises:
   (i). plurality of focusing reflectors, each having a focus with a relatively short focal length, for reflecting and converging the intercepted solar rays into sets of converging rays directed toward the respective foci; the reflector surfaces facing the front side of the integrated panel and existing within a zone, denoted as the reflector zone, which is within a certain depth from a reference plane that touches the front side of the integrated panel, the reflector surfaces dividing the panel into a bright region and a shadow region, which are respectively the region in front of, and the region behind the reflector surfaces with respect to the direction of solar rays falling perpendicular to the front side of the integrated panel,
   (ii). plurality of heat sinks placed close to the foci of the focusing reflectors for intercepting the sets of solar rays reflected and converged by the focusing reflectors, absorbing the energy of the rays and converting it solely into thermal energy therein;
   (iii). at least a heat transfer surface that is located in the shadow region of the panel and is in contact with a heat absorbing medium, at least a major part of the heat transfer surface being located away from the immediate vicinity of any of the heat sinks; and
   (iv). means constructed of a metal for conductively transmitting the thermal energy generated in the heat sinks to the heat transfer surface to thereby transmit the thermal energy to the heat absorbing medium.

2. A panel collector of claim 1, wherein at least a major part of the heat transfer surface transmitting thermal energy to the heat absorbing medium is placed in the shadow region within the reflector zone.

3. A panel collector of claim 1, wherein at least a major part of the heat transfer surface transmitting thermal energy to the heat absorbing medium is placed in the shadow region behind the reflector zone.

4. A panel collector of claim 1 which further comprises of a transparent cover placed in front of the integrated panel, wherein the bright region enclosed by the transparent cover and the reflector surfaces is evacuated to reduce heat loss through the transparent cover.

5. A panel collector of claim 2 which further comprises of a transparent cover placed in front of the integrated panel, wherein the bright region enclosed by the transparent cover and the reflector surfaces is evacuated to reduce heat loss through the transparent cover.

6. A panel collector of claim 3, which further comprises of a transparent cover placed in front of the integrated panel, wherein the bright region enclosed by the transparent cover and the reflector surfaces is evacuated to reduce heat loss through the transparent cover.

7. A panel collector of claim 1, wherein each of the focusing reflectors have a short focal length which is less than 5.5 cm.

8. A panel collector of claim 2, wherein each of the focusing reflectors have a short focal length which is less than 5.5 cm.

9. A panel collector of claim 3, wherein each of the focusing reflectors have a short focal length which is less than 5.5 cm.

10. A panel collector of claim 1, wherein the focusing reflectors are longitudinal semiparabolic reflectors.

11. A panel collector of claim 2, wherein the focusing reflectors are longitudinal semiparabolic reflectors.

12. A panel collector of claim 3, wherein the focusing reflectors are longitudinal semiparabolic reflectors.

13. A panel collector of claim 10 which further comprises of a transparent cover placed in front of the integrated panel, wherein the bright region enclosed by the transparent cover and the reflector surfaces is evacuated to reduce heat loss through the transparent cover and the focal length of the focusing reflectors is less than 3.0 cm.

14. A panel collector of claim 11 which further comprises of a transparent cover placed in front of the integrated panel, wherein the bright region enclosed by the transparent cover and the reflector surfaces is evacuated to reduce heat loss through the transparent cover and the focal length of the focusing reflectors is less than 3.0 cm.

15. A panel collector of claim 12 which further comprises of a transparent cover placed in front of the integrated panel, wherein the bright region enclosed by the transparent cover and the reflector surfaces is evacuated to reduce heat loss through the transparent cover and the focal length of the focusing reflectors is less than 3.0 cm.

* * * * *